United States Patent [19]
Pointer

[11] Patent Number: 5,100,687
[45] Date of Patent: Mar. 31, 1992

[54] PIPEABLE BAKERS JELLIES

[75] Inventor: Sidney J. Pointer, Bury St. Edmunds, Great Britain

[73] Assignee: Van den Bergh Foods Co., Division of Conopco, Inc., Lisle, Ill.

[21] Appl. No.: 566,643

[22] Filed: Aug. 13, 1990

[30] Foreign Application Priority Data

Aug. 25, 1989 [GB] United Kingdom ............... 8919326

[51] Int. Cl.$^5$ ............................................. A23L 1/05
[52] U.S. Cl. ..................................... 426/573; 426/575
[58] Field of Search ................................ 426/573, 575

[56] References Cited

U.S. PATENT DOCUMENTS

| | | | |
|---|---|---|---|
| 2,963,373 | 12/1960 | Monti et al. | 426/575 |
| 4,759,936 | 7/1988 | Best et al. | 426/573 |
| 5,019,414 | 5/1991 | Valdes | 426/573 |

FOREIGN PATENT DOCUMENTS

| | | | |
|---|---|---|---|
| 0023389 | 7/1978 | Japan | 426/577 |
| 0036261 | 8/1985 | Japan | 426/575 |
| 1501484 | 2/1978 | United Kingdom | |

OTHER PUBLICATIONS

Industrial Gums, R. Whistler, 1959, pp. 28-29, 85, 95.

*Primary Examiner*—Donald E. Czaja
*Assistant Examiner*—J. Aberle
*Attorney, Agent, or Firm*—Rimma Mitelman

[57] ABSTRACT

Pipeable bakers' jellies comprise an aqueous dispersion of unhydrolyzed gelling polysaccharide, preferably carrageenan, and are prepared by sieving a bakers' flan jelly at a temperature below its gelling point, e.g. 10° to 25° C. The pipeable jelly is reconvertible to flan jelly on heating.

12 Claims, No Drawings

PIPEABLE BAKERS JELLIES

This invention relates to bakers' jellies suitable for piping on confectionery and baked goods. The invention also relates to a process for the conversion of bakers' flan jellies to such pipeable bakers' jellies.

Bakers' jellies are usually composed of a dispersion of a natural gum or gel in a sugar solution, carrageenan being widely used for its favourable properties. Other suitable examples of gelling or colloidal polysaccharides include agar, alginates, furcellaran and mixtures of locust bean gum and xanthan gum, although the latter is too expensive for most commercial purposes. In addition to these carbohydrate gel materials, gelatin may also be suitable for certain purposes.

In use, bakers' jellies are made by dispersing these polysaccharides and similar gel-forming edible components to provide either a setting jelly for flans and similar confectionery, the composition setting, when cool, to a relatively resistant composition that can be cut cleanly with a knife, or a piping jelly for decorating cakes and the like. In addition to sugar, fruit flavours, colouring matter, preservatives such as potassium sorbate and other conventional additives may be present. Piping is traditionally applied by hand extrusion from a piping bag, but it may alternatively be carried out using a pressure dispensing device. The characteristics of the composition for piping must not only include susceptibility to extrusion under the relatively low hand pressure applied, but the extruded product must also retain its shape and continuity, without breaking up into short lengths after extrusion. For this purpose, bakers' jellies are too intractable and hitherto have been modified by acid treatment in which the gel undergoes an irreversible partial hydrolysis to a more yielding consistency enabling it to be piped.

The present invention provides a process for the conversion of bakers' flan jellies to pipeable jellies, which eliminates the need for chemical treatment and results in pipeable jelly products which can be converted at will back to bakers' jellies by heating. According to the present invention a process for the preparation of bakers' pipeable jelly from an aqueous dispersion of an edible gel comprises forcing the gel through an orifice at a temperature at which the gel is set and collecting the worked product.

The forcing can be carried out as an extrusion by pressing the gel through an orifice. A more preferred method is, however, pressing the gel through a large number of orifices by using a sieve. This sieve can be placed in the exit opening of an extruder.

The temperature at which the gel is sieved should preferably not exceed 40° C. and is more preferably within an ambient temperature range from 10° C. to 25° C. The pressure required to force the gel through the sieve increases with lower temperatures, particularly in the presence of sugars in the composition, which are usually present to provide sweetness and a preservative effect, but the temperature should not exceed the setting temperature of the gel.

Within practical limits, finer mesh sizes produce a more consistently smooth mouthfeel, coarser mesh sizes resulting in a lumpier product. A suitable mesh size range is from 50 to 100 microns. Smaller apertures than these require excessively high pressure to force the gel through and while the limit is not critical, bigger mesh sizes may produce a product of uneven quality according to the gel material selected. Multiple sieve passes are desirable to improve the uniformity of the product and a bank of two or more sieves in series may be used.

The products of the invention are novel, comprising unhydrolysed bakers' pipeable jelly, which is therefore free from any chemical modification and with the added advantage of reverting to bakers' flan jelly consistency simply by heating above its melting temperature and cooling for this purpose. The temperature to which it is heated is preferably within the range of 60° C. to 80° C. The pipeable jelly products of the present invention are therefore dual purpose, being immediately ready for piping and convertible by simple heating to produce a bakers' flan jelly. The product may therefore be pipeable jellies, since on heating they revert to the more rigid consistency of flan jellies. Being more mobile, added ingredients are more readily dispersed than in flan jellies which must be heated above their setting temperature for this purpose. The more mobile pipeable jelly product of the invention is more uniformly cooled in quantity by convection and conduction, thus simplifying packaging. It may also be produced to a low pH value while cool, enabling a more realistic fruit flavour where desired to be provided without inducing hydrolysis.

The pipeable jelly products of the invention may be marketed for either purpose, customers using them for piping or for conversion simply by heating to flan jelly.

Therefore, the products according to the invention comprise an aqueous sugar-containing dispersion of unhydrolysed gelling polysaccharide, which contains at least 25 wt. % of water and which is pipeable and heat-convertible.

From GB 1,501,484 icings are known, comprising mixtures of sugar and water with xanthan gum. These mixtures do not contain more than 10.5 wt. % of water and are not pipeable. They can be made pipeable by incorporation of a small amount of polyhydric alcohol.

Preferably, the products of the invention comprise an aqueous dispersion containing at least 50% sugar solution, of a gelled carrageenan, furcellaran, alginate, or agar gum, the concentration of polysaccharide being preferably from 0.1 to 10%, particularly 0.5 to 2.5%, and sugar from 10 to 50%, all parts being by weight.

The gelling polysaccharides from which the products of the invention may be made include carrageenan, locust bean gum and xanthan mixtures, agar, alginates and so-called Danish agar or furcellaran. A particular advantage of the pipeable jelly provided by the present invention is that, whereas a thickening agent, e.g. cellulose derivative such as methyl cellulose and sodium carboxymethyl cellulose is usually necessary for thickening hydrolysed pipeable jelly, these may not be necessary in the pipeable jellies of the present invention.

EXAMPLE

The following ingredients were mixed in the usual way, in the given ratios:

| Ingredient | % |
| --- | --- |
| Danish Agar | 0.7 |
| Glucose | 55.3 |
| Sugar | 15.5 |
| Water | 22.6 |
| Acid | 0.04 |
| Thickener | 0.09 |
| Condensate (water) | 5.7 |
| | 99.9 |

The mixture obtained was not pipeable.

The mixture was pressed through a sieve with openings of 70 microns, using a pressure of less than 5 bar.

The product obtained after sieving was pipeable. After heating this product to about 75° C., the product was reconverted into a bakers' flan jelly that was not pipeable any more.

I claim:

1. A baker's jelly composition consisting essentially of an aqueous sugar-containing dispersion of unhydrolysed gelling polysaccharide, which composition contains at least 25 wt. % of water and which composition is pipeable and heat-convertible, the composition comprising particles of a size obtainable after sieving through a sieve with a mesh size of 50-100 um.

2. Composition according to claim 1, in which the polysaccharide comprises agar, alginate or furcellaran.

3. Composition according to claim 1, in which the polysaccharide comprises carrageenan.

4. Composition according to claim 1, which composition comprises from 10 to 50 wt. % of sugar.

5. Composition according to claim 1, in which at least 50 wt. % of a sugar solution is present.

6. Composition according to claim 1, which comprises from 0.1 to 10 wt. % of polysaccharide.

7. A composition according to claim 1, which includes a cellulose thickening agent.

8. Process for the preparation of a composition as claimed in claim 1, which comprises pressing, a bakers' flan jelly comprising a dispersion of jelling polysaccharide in an aqueous sugar-containing solution, which is not pipeable at a temperature below its setting point, through at least one orifice.

9. Process according to claim 8 wherein the pressing is carried out by sieving.

10. Process according to claim 9, wherein the bakers' flan jelly is sieved at a temperature from 10° C. to 25° C.

11. Process according to claim 9, in which the bakers' flan jelly is sieved through a sieve with a mesh size of 50 to 100 microns.

12. Process according to claim 9, in which the bakers' flan jelly is sieved through a number of sieves in successive sieving steps.

* * * * *